United States Patent
Sasaki et al.

(10) Patent No.: US 10,816,962 B2
(45) Date of Patent: Oct. 27, 2020

(54) PROCESS CONTROL DEVICE, MANUFACTURING DEVICE, PROCESS CONTROL METHOD, CONTROL PROGRAM, AND RECORDING MEDIUM

(71) Applicant: OMRON Corporation, Kyoto (JP)

(72) Inventors: Hiromi Sasaki, Nagaokakyo (JP); Kenichiro Mori, Tama (JP); Hiroshi Yoshida, Kusatsu (JP)

(73) Assignee: OMRON Corporation, Kyoto (JP)

( * ) Notice: Subject to any disclaimer, the term of this patent is extended or adjusted under 35 U.S.C. 154(b) by 34 days.

(21) Appl. No.: 16/219,951

(22) Filed: Dec. 14, 2018

(65) Prior Publication Data

US 2019/0265682 A1 Aug. 29, 2019

(30) Foreign Application Priority Data

Feb. 26, 2018 (JP) .................. 2018-032052

(51) Int. Cl.
*G05B 19/418* (2006.01)
*G06F 9/52* (2006.01)

(52) U.S. Cl.
CPC . *G05B 19/41865* (2013.01); *G05B 19/41815* (2013.01); *G06F 9/524* (2013.01); *G05B 2219/32239* (2013.01); *G05B 2219/32252* (2013.01); *G05B 2219/32258* (2013.01); *G05B 2219/32283* (2013.01); *G05B 2219/32291* (2013.01); *Y02P 90/02* (2015.11)

(58) Field of Classification Search
None
See application file for complete search history.

(56) References Cited

U.S. PATENT DOCUMENTS

| | | | |
|---|---|---|---|
| 4,791,554 A | 12/1988 | Hirota et al. | |
| 6,336,204 B1* | 1/2002 | Jevtic | H01L 21/67276 414/936 |
| 6,466,835 B1* | 10/2002 | Ishizawa | H01L 21/67167 700/112 |
| 2013/0282182 A1* | 10/2013 | Hideg | G06Q 10/06 700/275 |
| 2019/0126482 A1* | 5/2019 | Tomita | B25J 9/1682 |

FOREIGN PATENT DOCUMENTS

JP 2005527893 9/2005

OTHER PUBLICATIONS

"Search Report of Europe Counterpart Application", dated Jun. 12, 2019, p. 1-p. 8.
Anonymous, "Deadlock," Wikipedia, Feb. 2018, pp. 1-6.

* cited by examiner

*Primary Examiner* — Sean Shechtman
(74) *Attorney, Agent, or Firm* — JCIPRNET

(57) ABSTRACT

A process control device includes a deadlock determination part that determines whether or not a deadlock occurrence situation occurs when a work process that is being executed and a work process scheduled to be executed next are executed simultaneously by referring to process constraint information in which a plurality of work processes and each work state of a plurality of process execution elements of a manufacturing device are associated with each other, and a process execution control part that delays an execution timing of the work process scheduled to be executed next when the deadlock determination part has determined that the deadlock occurrence situation occurs.

6 Claims, 6 Drawing Sheets

PROCESS CONTROL DEVICE, MANUFACTURING DEVICE, PROCESS CONTROL METHOD, CONTROL PROGRAM, AND RECORDING MEDIUM

CROSS-REFERENCE TO RELATED APPLICATION

This application claims the priority of Japan patent application serial no. 2018-032052, filed on Feb. 26, 2018. The entirety of the above-mentioned patent application is hereby incorporated by reference herein and made a part of this specification.

BACKGROUND

Technical Field

The disclosure relates to, for example, a process control device that controls work processes of a manufacturing device that includes a plurality of process execution elements that can operate simultaneously and simultaneously manufactures a plurality of products using the plurality of process execution elements.

Description of Related Art

A plurality of modules (process execution elements) of a manufacturing device that simultaneously manufactures a plurality of products operate simultaneously when manufacturing the plurality of products (hereinafter, operating in this way is referred to as "operating in parallel" and such a property is referred to as "parallelism"). Therefore, it is necessary for a control program for the manufacturing device to have parallelism and for the plurality of modules of the manufacturing device to satisfy constraints based on a mechanism or the like. In order to simultaneously satisfy the two conditions, a highly independent program is created for each module and the respective modules reflectively cooperate with each other using local information, thereby realizing parallelism (for example, a certain module may execute a process of receiving a workpiece (a product that is being manufactured), processing the workpiece, and only passing the workpiece to a next step according to the program, and in the manufacturing device, a plurality of such modules may be installed side by side and, as a result, satisfactorily cooperate with each other as a whole).

As an example of a technology as described above, Patent Document 1 describes an automatic generation device for automated software that includes a generator including a software generator and a project generator. The software generator generates a development environment, particularly, on the basis of first data that can be determined in advance or has been determined in advance, such as planning data, program knowledge, and management knowledge. Further, the project generator generates control software, particularly, on the basis of second data that can be determined in advance or has been determined in advance, such as planning data, experience data, and hardware knowledge using the development environment.

PATENT DOCUMENTS

[Patent Document 1]
Japanese Laid-Open No. 2005-527893 (Sep. 15, 2005)
Parallelism may be satisfactorily exhibited by adopting the above-described program, but an operation of the entire manufacturing device is implicit. In greater detail, (1) it is difficult to ascertain and understand the operation of the entire manufacturing device. Further, (2) optimization is also difficult due to a difficulty in predicting the operation of the entire manufacturing device.

The above-described case will be described in greater detail below. In the manufacturing device described above, a deadlock may occur between the work processes in which the plurality of modules or the workpiece (process execution elements) described above are resources. More specifically, deadlock means a situation in which a first resource secured in a first work process is a resource necessary for release of a second resource in a second work process, and the second resource secured in the second work process is a resource necessary for release of the first resource in the first work process. In such a situation, resource competition may occur between the work processes.

Therefore, when software for performing deadlock avoidance is created statically in advance as a highly independent program for each of the above-described modules, parallelism may be degraded and the performance of the device may deteriorate since design is performed in consideration of deadlock in all operations that are likely to operate in parallel. Alternatively, the design may become complicated in order to suppress such degradation of parallelism.

SUMMARY

A process control device according to an aspect of the disclosure is a process control device that controls work processes of a manufacturing device that includes a plurality of process execution elements that can operate simultaneously and simultaneously manufactures a plurality of products using the plurality of process execution elements, the process control device including: a process execution control part that causes a process execution element to execute a work process in response to a predetermined trigger by referring to process constraint information in which a plurality of work processes and each work state of the plurality of process execution elements of the manufacturing device are associated with each other; and a deadlock determination part that determines whether or not a deadlock occurrence situation will occur if a work process that is being executed and a work process scheduled to be executed next were executed simultaneously by referring to the process constraint information, wherein when the deadlock determination part has determined that a deadlock occurrence situation will occur, the process execution control part delays an execution timing of the work process scheduled to be executed next.

A process control method according to an aspect of the disclosure is a process control method for controlling work processes of a manufacturing device that includes a plurality of process execution elements that can operate simultaneously and simultaneously manufactures a plurality of products using the plurality of process execution elements, the process control method including: a process execution control step of causing the process execution element to execute the work process in response to a predetermined trigger by referring to process constraint information in which a plurality of work processes and each work state of the plurality of process execution elements of the manufacturing device are associated with each other; and a deadlock determination step of determining whether or not a deadlock occurrence situation occurs when a work process that is being executed and a work process scheduled to be executed next are executed simultaneously by referring to the process constraint information, wherein when it has determined in the deadlock determination step that a deadlock occurrence situation occurs, the process execution control step includes delaying an execution timing of the work process scheduled to be executed next.

DESCRIPTION OF THE EMBODIMENTS

Figure 1:
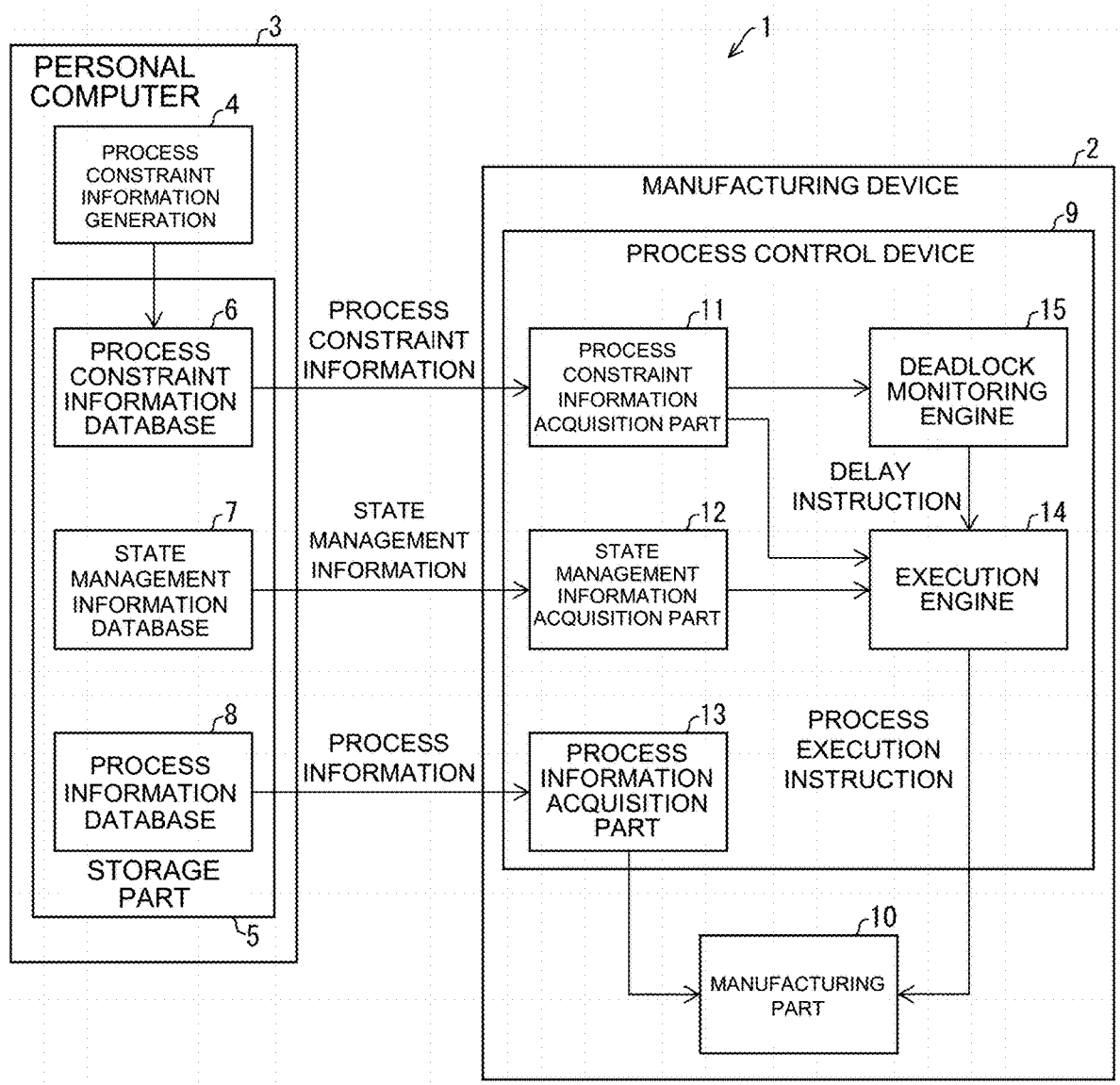
FIG. 1 is a block diagram illustrating a configuration of a manufacturing system including a manufacturing device according to an embodiment of the disclosure.

The embodiments of the disclosure provide a technology capable of suppressing degradation of parallelism and avoiding deadlock with a simple design in a manufacturing device that simultaneously manufactures a plurality of products.

According to the above configuration, it is possible to dynamically perform deadlock avoidance by delaying the work process corresponding to only the deadlock present between the work process that is being executed and a work process next to the work process that is being executed. Therefore, it is possible to suppress deterioration of parallelism and to avoid deadlock with a simple design.

In the process control device according to an aspect of the disclosure, the deadlock determination part may extract a first resource in which there is a work state corresponding to a first work process that is being executed, and a second resource in which there is a work state corresponding to a second work process that is a process next to the first work process by referring to the process constraint information, generate resource correspondence information in which the first work process, the first resource, and the second resource are associated with each other, and determine whether or not a deadlock occurrence situation will occur by referring to the resource correspondence information.

According to the above configuration, it is possible to easily determine whether or not a deadlock occurs by ascertaining resources circulating between the work processes by referring to the generated resource correspondence information. Accordingly, since deadlock can be efficiently avoided, it is possible to suppress degradation of parallelism and to avoid deadlock with a simple design.

In the process control device according to an aspect of the disclosure, the deadlock determination part may extract a first resource in which there is a work state corresponding to a first work process that is being executed, a second resource in which there is a work state corresponding to a second work process that is a process next to the first work process, a third resource in which there is a work state corresponding to a third work process scheduled to be executed next, and a fourth resource in which there is a work state corresponding to a fourth work process that is a process next to the third work process by referring to the process constraint information and the resource correspondence information, and determine that a deadlock occurrence situation occurs between the first work process and the third work process when the first resource is the same as the fourth resource and the second resource is the same as the third resource.

According to the above configuration, it is possible to easily determine whether or not deadlock occurs by determining the correspondence relationship between the resources extracted from the process constraint information and the resource correspondence information as described above. Accordingly, since deadlock can be efficiently avoided, it is possible to suppress degradation of parallelism and to avoid deadlock with a simple design.

A manufacturing device according to an aspect of the disclosure includes the process control device according to any one of aspects; and a plurality of process execution elements.

According to the above configuration, it is possible to dynamically perform deadlock avoidance by delaying a work process corresponding to only the deadlock present between the work process that is being executed and a work process next to the work process that is being executed. Therefore, it is possible to suppress deterioration of parallelism and to avoid deadlock with a simple design.

According to the above configuration, it is possible to dynamically perform deadlock avoidance by delaying the work process corresponding to only the deadlock present between the work process that is being executed and a work process next to the work process that is being executed. Therefore, it is possible to suppress deterioration of parallelism and to avoid deadlock with a simple design.

According to the aspect of the disclosure, it is possible to suppress degradation of parallelism and avoid deadlock with a simple design in a manufacturing device that simultaneously manufactures a plurality of products.

Embodiment 1

Hereinafter, an embodiment according to one aspect of the disclosure (hereinafter also referred to as an "embodiment") will be described in detail. Here, a configuration described in the embodiment is not intended to limit the scope of the disclosure unless otherwise specified, and is merely an explanatory example.

§ 1 Application Example

FIG. 1 is a block diagram illustrating a configuration of a manufacturing system 1 including a manufacturing device 2 according to the embodiment (each of components of the manufacturing system 1 will be described in detail below). First, an overview of a process control method that is executed by the process control device 9 included in the manufacturing device 2 will be described in order to facilitate understanding of the process control method that is executed by the manufacturing device 2 illustrated in FIG. 1.

The manufacturing device 2 includes a plurality of modules that can operate simultaneously, and simultaneously manufactures a plurality of products using the plurality of modules. In such a configuration, deadlock is likely to occur when a work process that is being executed and a work process scheduled to be executed next are executed simultaneously. Therefore, the process control device 9 controls the execution of each work process so that the deadlock is avoided.

The process control device 9 selects a work process to be executed next by referring to process constraint information in which a plurality of work processes and each work state of a plurality of modules or workpieces (process execution elements) are associated with each other, and causes each module (process execution element) to execute a selected work process in response to a predetermined trigger (supply of a workpiece or the like).

The process constraint information is data in which a work process, a work state necessary (a work state of a plurality of modules or a workpiece) before the work process is executed, and a work state transitioning from the work state after the work process has been executed are associated with each other. The process control device 9 determines whether or not a deadlock occurrence situation occurs from a relationship between resources required in each work process by referring to the process constraint information.

The process control device 9 monitors the operation of the execution engine, and determines whether or not a deadlock occurrence situation occurs when a work process that is being executed and a work process scheduled to be executed next are executed simultaneously by referring to the process constraint information. When the process control device 9 has determined that the deadlock occurrence situation occurs, the execution engine 14 delays an execution timing of the work process scheduled to be executed next.

The process control device 9 dynamically avoids deadlock by changing the order of execution of the work processes according to the work process that is being executed, by executing the above process control method.

§ 2 Example of Configuration

[Review of Process Control Method]

A review of the process control method that is executed by the process control device 9 included in the manufacturing device 2 will be described in the following respective items.

<Overview>

The manufacturing device 2 according to the embodiment generates a process for efficiently manufacturing a plurality of products on the basis of constraints of the manufacturing device 2, a process that can be executed by the manufacturing device 2, and an activity diagram indicating a product assembly procedure.

<Assembly Procedure and Device State>

Hereinafter, data indicating a product assembly procedure and data indicating a state of the manufacturing device 2 which are referred to by the manufacturing device 2 according to the embodiment will be described.

(Plurality of Modules)

Figure 2:
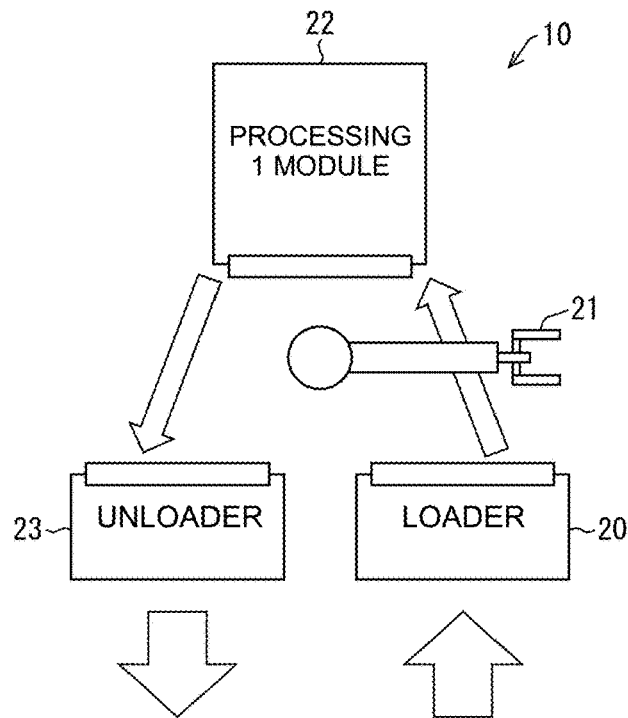
FIG. 2 is a schematic diagram illustrating a configuration of a plurality of modules included in the manufacturing device according to the embodiment of the disclosure.

FIG. 2 is a schematic diagram illustrating a configuration of the manufacturing part 10. First, an overview of the manufacturing part 10 included in the manufacturing device 2 according to the embodiment as a configuration that is a target of the data will be described with reference to FIG. 2. The manufacturing part 10 includes a plurality of modules (a plurality of process execution elements), and simultaneously manufactures a plurality of products using the plurality of modules.

More specifically, as illustrated in FIG. 2, the manufacturing part 10 includes a loader 20, a robot 21, a processing 1 module 22, and an unloader 23, as a plurality of modules. These modules sequentially execute the following operations (1) to (5) for each workpiece (that is, a plurality of products are manufactured simultaneously by being subjected to a process of one of the following (1) to (5)).

(1) The loader 20 accepts the supplied workpiece (a product that is being manufactured).

(2) The robot 21 takes out the workpiece from the loader 20 and conveys the workpiece to the processing 1 module 22.

(3) The processing 1 module 22 processes the workpiece supplied from the robot 21.

(4) The robot 21 takes out the processed workpiece from the processing 1 module 22 and conveys the workpiece to the unloader 23.

(5) The unloader 23 ejects the workpiece supplied from the robot 21.

(Assembly Procedure)

Figure 3:
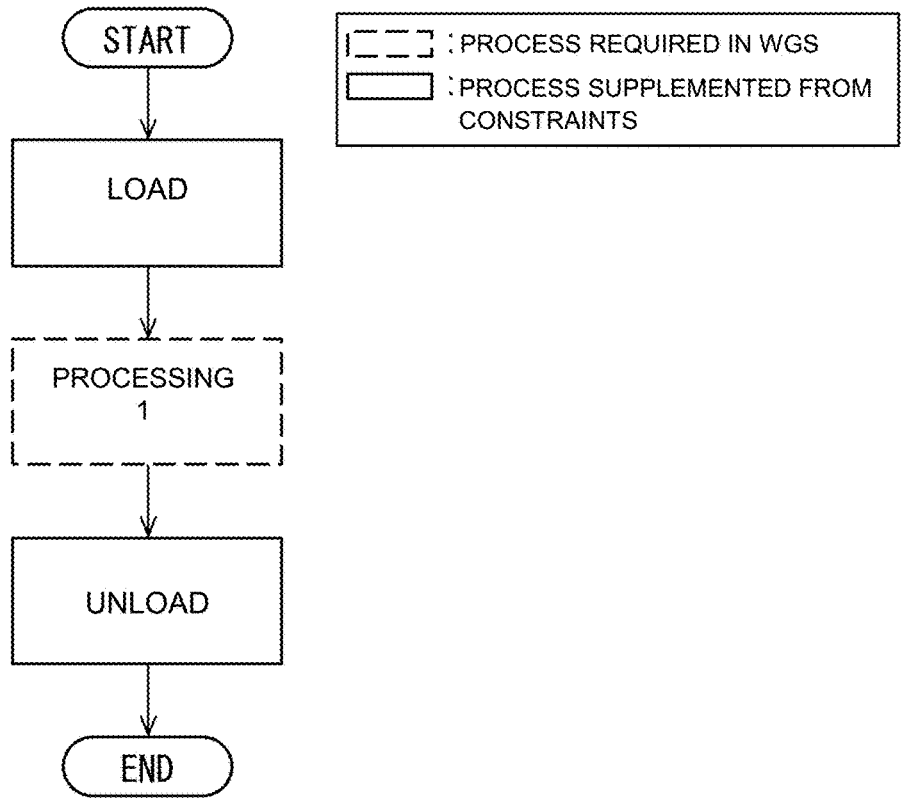
FIG. 3 is a flowchart diagram of a product assembly procedure indicated by work process information that is referred to by the manufacturing device according to the embodiment of the disclosure.

FIG. 3 is a flowchart diagram of a product assembly procedure that is indicated by work process information. Next, data (work process information) indicating the product assembly procedure which is referred to by the manufacturing device 2 according to the embodiment will be described with reference to FIG. 3. As illustrated in FIG. 3, the product assembly procedure indicated by the work process information includes loading, processing 1, and unloading in an order of execution. Thus, the work process information is data indicating the order of execution of work processes (the product assembly procedure) for one workpiece.

In the work process information illustrated in FIG. 3, only processing 1 is required for manufacture of a product, and a loading process and an unloading process are processes added due to constraints in a structure of the manufacturing device 2. In the loading process and the unloading process, a granularity of the process can be further increased. For example, picking and placing may be separated. Thus, as the granularity becomes higher, a more efficient operation such as an increase in parallelism becomes possible. However, on the other hand, a design may then become complicated.

(Device State)

Figure 4:
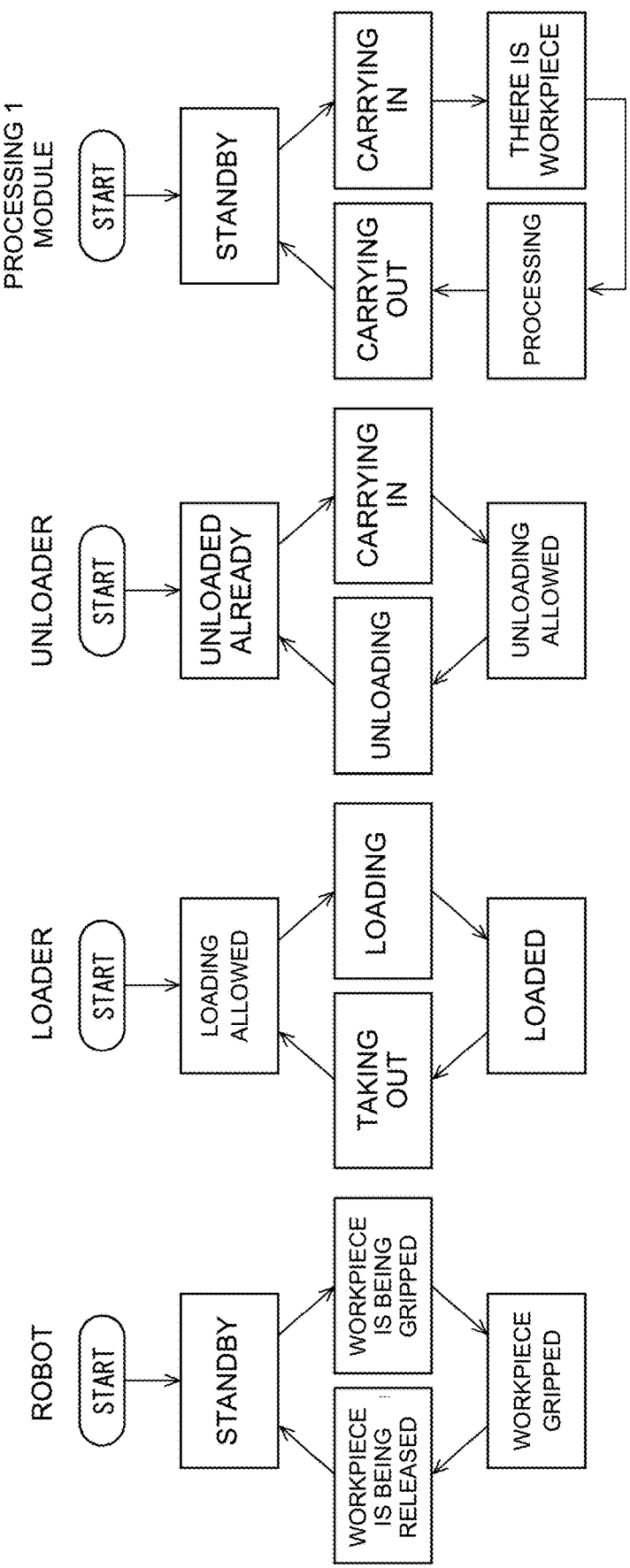
FIG. 4 is a diagram of each state transition of a plurality of modules indicated by work state information that is referred to by the manufacturing device according to the embodiment of the disclosure.

FIG. 4 is a diagram illustrating a state transition of each module of the manufacturing device 2 indicated by the work state information. Next, data (work state information) indicating the state transition (device state transition) of each module of the manufacturing device 2 which is referred to by the manufacturing device 2 according to the embodiment will be described with reference to FIG. 4.

In the work state information illustrated in FIG. 4, a work state in the robot 21 transitions in an order of "standby", "workpiece is being gripped", "workpiece is gripped" and "workpiece is being released" (the state returns to "standby" next to "workpiece is being released", and these state transitions are repeated).

Further, in the work state information illustrated in FIG. 4, a work state in the loader 20 transitions in an order of "loading allowed", "loading", "loaded", and "taking out" (the state returns to "loading allowed" next to "taking out", and these state transitions are repeated).

Further, in the work state information illustrated in FIG. 4, a work state in the unloader 23 transitions in an order of "unloaded already", "taking in", "unloading allowed" and "unloading" (the state returns to "unloaded already" next to "unloading", and these state transitions are repeated).

Further, in the work state information illustrated in FIG. 4, a work state in the processing 1 module 22 transitions in an order of "standby", "carrying in", "there is a workpiece", "processing" and "carrying out" (the state returns to "standby" next to "carrying out", and these state transitions are repeated).

The manufacturing device 2 includes a plurality of modules (the loader 20, the robot 21, the processing 1 module 22, and the unloader 23 described above) that operate in parallel. Each module has a state (a working state). The modules can be further divided. More efficient control becomes possible as the granularity becomes lower, but the control itself becomes complicated. Further, in the embodiment, for simplicity, a configuration in which each module includes a module in one layer of is described. However, the module can be hierarchized and one module can include a plurality of modules that perform operations in parallel. Further, in the work state information illustrated in FIG. 4, only the state transition (transition of the work state) regarding the control of each module is shown, and a part regarding a function realized by the module is excluded.

(Process Constraint Information)

Next, process constraint information indicating a table collectively showing the product assembly procedure and the state transition of the manufacturing device 2, which is referred to by the manufacturing device 2 according to the embodiment will be described. Since the above-described product assembly procedure indicated by the work process information is realized by a plurality of modules of the manufacturing device 2, the state transition of each module (and the state transition of the workpiece) indicated by the above-described work state information becomes the upper limit of the constraints of the procedure. Therefore, the manufacturing device 2 refers to the process constraint information indicating a table collectively showing the assembly procedure indicated by the above-described work process information and the state transitions indicated by the above-described work state information. Table 1 below is an example of the process constraint information.

TABLE 1

State of resource required by process [state of resource after process has been executed] [state of resource on execution]

| Process | Workpiece | Loader | Unloader | Processing 1 module | Robot |
|---|---|---|---|---|---|
| Initial state | Unloaded | Loading Allowed | Unloaded already | Standby | Standby |
| Loading | Unloaded/ loaded | Loading Allowed/ Loaded on loading | | | |
| Taking out from loader | Unloaded/ unprocessed | Loaded/ loading allowed | | | Standby/ workpiece gripped on workpiece gripping |
| Conveying to processing 1 module | Unprocessed | | | Standby/ there is workpiece | Workpiece gripped/ standby on workpiece releasing |
| Processing 1 | Unprocessed/ Processed | | | There is workpiece on processing | |
| Taking out from processing 1 module | Processed | | | There is workpiece/ standby | Standby/ workpiece gripped on workpiece gripping |
| Conveying to unloader | Processed | | Unloaded already/ unloading allowed | | workpiece gripped/ standby on workpiece releasing |
| Unloading | Processed/ taken out | | Unloading allowed/ unloaded already | | |
| End state | Taken out | Loading Allowed | Unloaded already | Standby | Standby |

Items on the vertical axis in Table 1 are respective work processes indicated by the work process information. It should be noted that an order of an assembly procedure shown in a vertical axis of Table 1 indicates an order of execution for one workpiece. However, for example, when there are a plurality of processing paths in the manufacturing device 2, a plurality of work processes for each processing path may be sequentially shown as items on the vertical axis in Table 1 instead of the order of execution for one workpiece. However, the items on the vertical axis in Table 1 include an initial state and an end state as special processes other than the assembly procedure. Items on a horizontal axis in Table 1 are modules and workpieces (resources) indicated by the work state information. It should be noted that an order of the resources shown in the horizontal axis of Table 1 is arbitrary.

Figure 5:
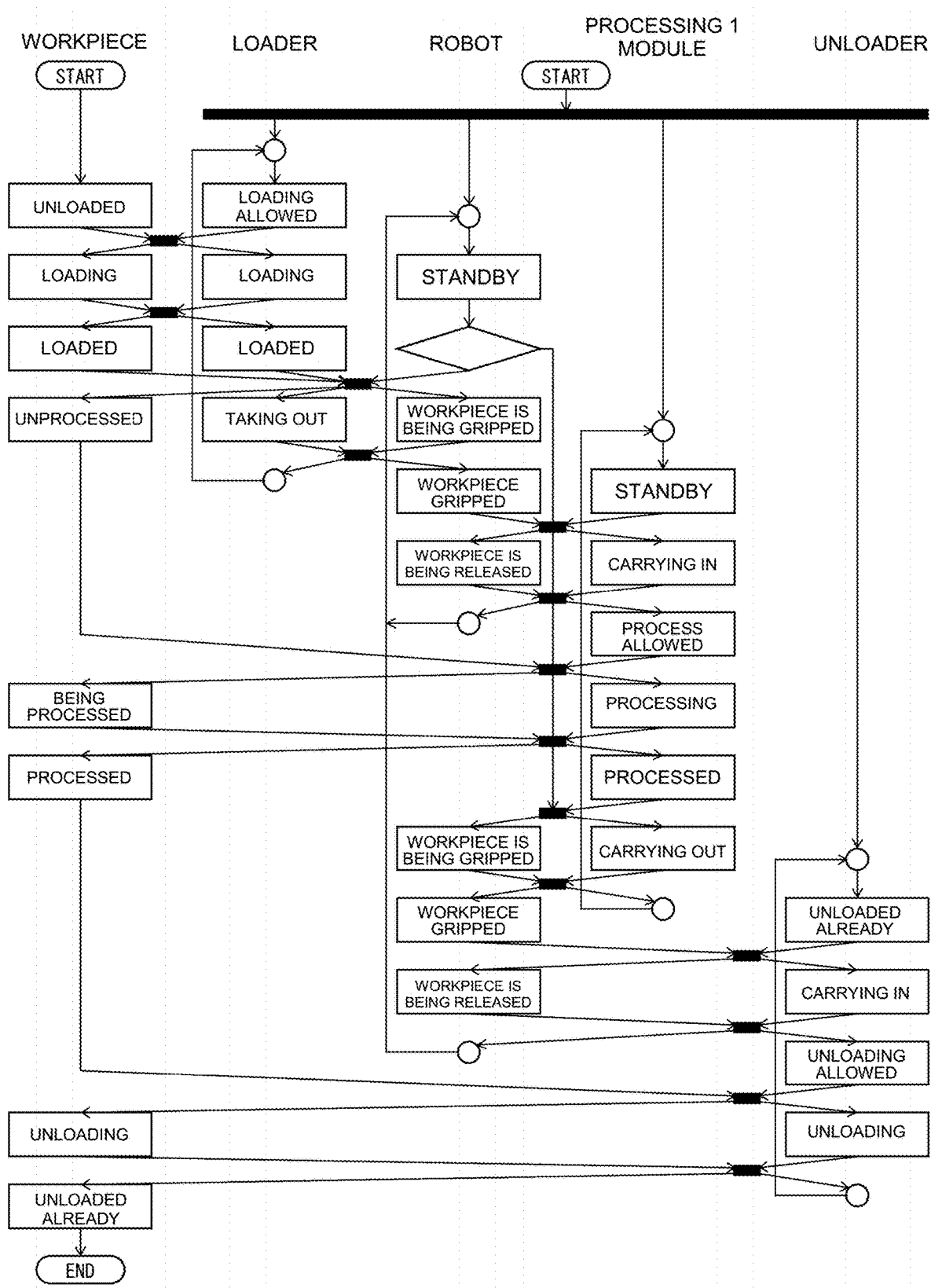
FIG. 5 is a state transition diagram illustrating content of process constraint information that is referred to by the manufacturing device according to the embodiment of the disclosure.

Cells corresponding to respective items on the vertical axis and each item on the horizontal axis in Table 1 indicate a state transition of each resource in each work process. When "A/B" is shown in the cell (for example, "unloaded/ loaded"), A indicates a work state (precondition) of the resource required by the corresponding work process, and B indicates a work state (postcondition) of the resource after the corresponding work process is executed. Further, when only "C" is shown in a corresponding cell (for example, "unprocessed"), C indicates a work state of the resources required by a corresponding work process, and indicates a work state of resources after the corresponding work process has been executed (that is, there is no change in the work state of the resources after the work process has been performed). In addition, when "on D" is described together with "A/B" or "C" (for example, on processing being performed), D indicates a work state of the resources while a corresponding work process is being executed (an in-execution state). FIG. 5 is a state transition diagram illustrating content of the process constraint information of Table 1 above.

As a method of creating a table indicated by the process constraint information, first, an assembly procedure indicated by the work process information is extracted as items on the vertical axis, and a resource indicated by the work state information is extracted as the item on the horizontal axis. Then, in the cell corresponding to each item on the vertical axis and each item on the horizontal axis, a precondition or the postcondition necessary for execution of a work process that is a target is described, and when some time is taken to execute the work process, the in-execution state is additionally described (in Table 1, substantially all processes basically have an in-execution state, but in-execution states other than the in-execution state affecting exclusion are omitted).

<Determination of Order of Execution>

Hereinafter, an order of execution of work processes that are executed by the manufacturing device 2 according to the embodiment will be described below.

Examples of a timing at which the order of execution of the work processes is generated may include that in a method of statically generating the order of execution of work processes and a method of dynamically generating the order of execution of the work processes. More specifically, in the method of statically generating the order of execution of work process, an execution procedure avoiding deadlock is completely programmed in advance (including parallel processing) and the work processes are sequentially performed according to the order of execution. On the other hand, in the method of dynamically generating the order of execution of the work process, the order of execution of the work processes is generated according to a work process that is being executed.

In the method of statically generating the order of execution of the work processes, the order of execution can be optimized by using, for example, a scheme of using an evaluation function, but this method is difficult because a response may be complicated. Further, in this method, since a timing of the work processes that actually operate in parallel is changed according to, for example, an operation timing of a mechanism, standby or the like may occur so that work processes do not deviate from the order of execution of work processes generated statically in advance, and the method may become complicated. Therefore, the manufacturing device 2 according to the embodiment dynamically generates the order of execution of the work processes.

[Configuration of Manufacturing Device 2 and Process Control Method]

A configuration of the manufacturing device 2 and the process control method according to the embodiment will be described according to the following after the overview and the review described above.

<Main Configuration of Manufacturing Device 2>

FIG. 1 is a block diagram illustrating a configuration of the manufacturing system 1 including the manufacturing device 2 according to the embodiment, as described above. Hereinafter, a main configuration of the manufacturing device 2 according to the embodiment will be described with reference to FIG. 1. The manufacturing system 1 further includes a personal computer 3 (development environment), in addition to the manufacturing device 2.

The personal computer 3 includes a process constraint information generation part 4 and a storage part 5. The process constraint information generation part 4 generates process constraint information by referring to the work process information and the work state information. The storage part 5 includes a process constraint information database 6, a state management information database 7, and a process information database 8. The process constraint information database 6 stores the process constraint information generated by the process constraint information generation part 4, the state management information database 7 stores the state management information, and the process information database 8 stores the process information.

The work process information is data indicating the order of execution of the work processes (the product assembly procedure) for one workpiece, as described above. Further, the work state information is data indicating a transition of each work state of a plurality of process execution elements (modules and a workpiece) corresponding to the work processes, as described above.

In addition, the process constraint information is data in which respective work processes and respective work states of a plurality of process execution elements are associated with each other, as described above. More specifically, the process constraint information can be data in which a work process, a work state necessary (a work state of the process execution element) before the work process is executed, and a work state transitioning from the work state after the work process has been executed are associated with each other.

Further, the state management information is a program for managing a state of each module of the manufacturing device 2, which is created by the user. More specifically, for example, in the case of an automatic driving mode, the manufacturing device 2 instructs the execution engine 14 to process the workpiece in response to supply of the workpiece according to the program, and causes each module to start an operation.

Further, the process information is a specific program of the work process described in the work process information and the process constraint information described above.

The manufacturing device 2 includes a process control device 9 and a manufacturing part 10. The process control device 9 includes a process constraint information acquisition part 11, a state management information acquisition part 12, a process information acquisition part 13, an execution engine 14 (a process execution control part), and a deadlock monitoring engine 15 (a deadlock determination part).

The process constraint information acquisition part 11 acquires the process constraint information from the process constraint information database 6 of the storage part 5 of the personal computer 3. The state management information acquisition part 12 acquires the state management information from the state management information database 7 of the storage part 5 of the personal computer 3. The process information acquisition part 13 acquires the process information from the process information database 8 of the storage part 5 of the personal computer 3.

The execution engine 14 selects a work process to be executed next by referring to the process constraint information acquired by the process constraint information acquisition part 11 and causes each module (the process execution element) of the manufacturing part 10 to execute the work process in response to a predetermined trigger (supply of a workpiece or the like) by referring to the state management information acquired by the state management information acquisition part 12. It should be noted that the same method as the method described in the item "overview and review of process control method" described above can be used for a method with which the execution engine 14 selects a work process.

The deadlock monitoring engine 15 monitors the operation of the execution engine 14, and determines whether or not a deadlock occurrence situation occurs when a work process that is being executed and a work process scheduled to be executed next are executed simultaneously by referring to the process constraint information acquired by the process constraint information acquisition part 11. Further, the deadlock monitoring engine 15 instructs the execution engine 14 to delay the execution timing of the work process scheduled to be executed next when it has been determined that the deadlock occurrence situation occurs.

The manufacturing part 10 includes the plurality of modules illustrated in FIG. 2, as described above. Each of the plurality of modules executes a work process instructed by the deadlock monitoring engine 15 by referring to the process information acquired by the process information acquisition part 13.

<Process Control Method>

Figure 6:
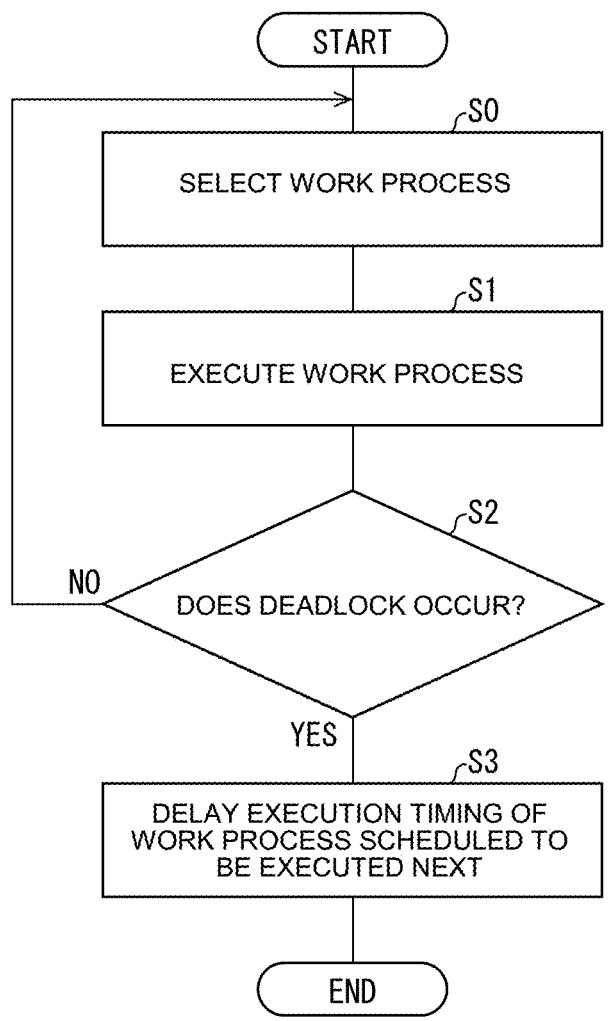
FIG. 6 is a flowchart illustrating a process control method in a process control device included in the manufacturing device according to the embodiment of the disclosure.

FIG. 6 is a flowchart illustrating a process control method in the manufacturing device 2 according to the embodiment. Hereinafter, a process control method in the manufacturing device 2 according to the embodiment will be described with reference to FIG. 6.

First, the execution engine 14 selects the work process to be executed next by referring to the process constraint information acquired by the process constraint information acquisition part 11 (step S0).

Then, the execution engine 14 causes each module (process execution element) of the manufacturing part 10 to execute the selected work process in response to a predetermined trigger (supply of a workpiece or the like) by referring to state management information acquired by the state management information acquisition part 12 (step S1).

Then, the deadlock monitoring engine 15 monitors an operation of the execution engine 14, and determines whether or not a deadlock occurrence situation occurs when the work process that is being executed and the work process scheduled to be executed next are executed simultaneously by referring to the process constraint information acquired by the process constraint information acquisition part 11 (step S2). Details of the deadlock determination method in the deadlock monitoring engine 15 will be described below.

In step S2, when the deadlock monitoring engine 15 has determined that a deadlock occurrence situation occurs (YES in step S2), the execution engine 14 delays the execution timing of the work process scheduled to be executed next (step S3).

In step S2, when the deadlock monitoring engine 15 has determined that deadlock will not occur (NO in step S2), the process returns to step S0.

Steps S0 to S3 described above are repeatedly executed, and the manufacturing device 2 delays the work process scheduled to be executed next when it has been determined that the deadlock occurrence situation occurs. Accordingly, it is possible to dynamically change the order of execution of work processes.

As described above, the process control device 9 included in the manufacturing device 2 according to the embodiment includes the execution engine 14 (a process execution control part) that causes each process execution element to execute the work process in response to a predetermined trigger (supply of workpiece or the like) by referring to process constraint information in which a plurality of work processes and each work state of a plurality of modules or workpieces (process execution elements) are associated with each other, and the deadlock monitoring engine 15 (a deadlock determination part) that determines whether or not a deadlock occurrence situation occurs when a work process that is being executed and a work process scheduled to be executed next are executed simultaneously by referring to the process constraint information, wherein when the deadlock monitoring engine 15 has determined that the deadlock occurrence situation occurs, the execution engine 14 delays an execution timing of the work process scheduled to be executed next.

According to the above configuration, it is possible to dynamically perform deadlock avoidance by delaying the work process corresponding to only the deadlock present between the work process that is being executed and a work process next to the work process that is being executed. Therefore, it is possible to suppress deterioration of parallelism and to avoid deadlock with a simple design.

<Specific Example of Deadlock Determination>

(Each Step of Deadlock Determination)

Figure 7:
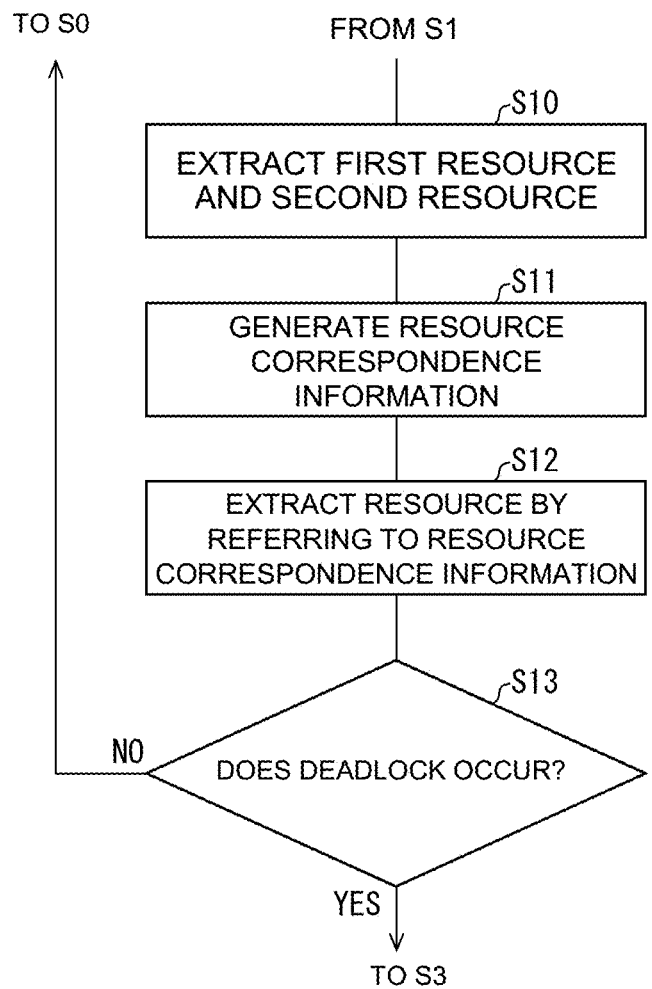
FIG. 7 is a flowchart illustrating a deadlock determination method in the process control device included in the manufacturing device according to the embodiment of the disclosure.

FIG. 7 is a flowchart illustrating details of the deadlock determination method in step S2 in the process control method in the manufacturing device 2 according to the embodiment. Hereinafter, a deadlock determination method in the manufacturing device 2 according to the embodiment will be described with reference to FIG. 7.

First, the deadlock monitoring engine 15 monitors an operation of the execution engine 14, and extracts a first resource in which there is a work state corresponding to the first work process being executed and a second resource in which there is a work state corresponding to a second work process (a next work process in the order of execution of work processes for one workpiece) which is a process next to the first work process by referring to the process constraint information acquired by the process constraint information acquisition part 11 (step S10). It should be noted that the deadlock monitoring engine 15 similarly executes the process of step S10 for a work process scheduled to be executed next.

Next, the deadlock monitoring engine 15 generates resource correspondence information in which the first work process, the first resource, and the second resource extracted in step S10 are associated with each other (step S11). It should be noted that when the deadlock monitoring engine 15 generates the resource correspondence information, the deadlock monitoring engine 15 also performs the same association on information extracted for the work process scheduled to be executed next in step S10 as in step S11.

As described above, it is possible to easily determine whether or not deadlock occurs by ascertaining resources circulating between the work processes by referring to the generated resource correspondence information. Accordingly, since deadlock can be efficiently avoided, it is possible to suppress degradation of parallelism and to avoid deadlock with a simple design.

As a step next to step S11, the deadlock monitoring engine 15 extracts the following information (1) to (4) by referring to the process constraint information acquired by the process constraint information acquisition part 11 and the resource correspondence information generated in step S11 (step S12).

(1) The first resource in which there is the work state corresponding to the first work process being executed.

(2) The second resource in which there is the work state corresponding to the second work process which is the next step of the first work process.

(3) A third resource in which there is a work state corresponding to a third work process scheduled to be executed next.

(4) A fourth resource in which there is a work state corresponding to a fourth work process which is a next step of the third work process.

Next, the deadlock monitoring engine 15 determines whether or not the first resource extracted in step S12 is the same as the fourth resource and whether the second resource is the same as the third resource to thereby determine whether or not a situation in which deadlock occurs between the first work process and the third work process occurs (step S13). When the deadlock monitoring engine 15 has determined that a deadlock occurrence situation occurs, the process proceeds to step S3 described above. When the deadlock monitoring engine 15 has determined that deadlock will not occur, the process returns to step S0.

It is possible to easily determine whether or not deadlock occurs by determining the correspondence relationship between the resources extracted from the process constraint information and the resource correspondence information as described above. Accordingly, since deadlock can be efficiently avoided, it is possible to suppress degradation of parallelism and to avoid deadlock with a simple design.

(Specific Behavior of Deadlock Monitoring Engine 15)

Hereinafter, a specific example of the deadlock determination method in steps S10 to S13 described above will be described. The deadlock monitoring engine 15 detects entry into a state in which deadlock occurs and suppresses execution of the work process so that deadlock does not occur. More specifically, in a case in which, when a certain resource (each module of the manufacturing device 2, the workpiece, and the like) (a first resource) is used in a certain process (a first process), another resource (a second resource) is necessary for release of the first resource, and when the other resource is used in another process (a second process), a certain resource is necessary for release of the other resource, deadlock may occur. The manufacturing device 2 automatically determines this relationship from the process constraint information "a representation (process constraint information) collectively indicating an assembly procedure (an order of execution of work processes for one workpiece) and a device state (a work state of each module)". For example, the process of "conveying to the unloader" can be executed while the robot 21 is being secured, and at this time, the unloader 23 is secured. That is, the unloader 23 is necessary for the robot 21. In addition, for the robot 21 that is used in the process of "taking out from the processing 1 module" that is performed before "conveying to the unloader", the unloader 23 is secured for release of resources. Generalizing this relationship, a relationship in which, for a first resource (the robot) in which there is a work state (work gripped or standby (see Table 1)) corresponding to the first work process (conveying to the unloader) that is being executed, a second resource (the unloader) in which there is a work state (unloaded already or unloading allowed) corresponding to the second work process (unloading) that is a process next to the first work process is necessary is satisfied. The same applies to a process of "taking out from processing 1 module". The above relationship is summarized in Table 2 (resource correspondence information) below.

TABLE 2

| | Resource to be secured for resource release | | | | |
|---|---|---|---|---|---|
| Process | workpiece | Loader | Unloader | Processing 1 module | Robot |
| Initial state | — | — | — | — | — |
| Loading | — | Robot | | | |
| Taking out from loader | — | Robot | | | Processing 1 module |
| Conveying to processing 1 module | — | | | Robot | Processing 1 module |

TABLE 2-continued

| | Resource to be secured for resource release | | | | |
|---|---|---|---|---|---|
| Process | workpiece | Loader | Unloader | Processing 1 module | Robot |
| Processing 1 | — | | | Robot | |
| Taking out from processing 1 module | — | | | Robot | Unloader |
| Conveying to unloader | — | | — | | Unloader |
| Unloading | — | | — | | |
| End state | — | — | — | — | — |

In the resource correspondence information shown in Table 2, each item on a vertical axis is each work process based on work process information. An order of the items on the vertical axis indicates an order of execution of the work processes for one workpiece. Further, each item on a horizontal axis is each resource based on the work state information. The order of the items on the horizontal axis is arbitrary.

The deadlock monitoring engine 15 monitors a behavior of the execution engine by referring to the resource correspondence information shown in Table 2. It is assumed that the manufacturing device 2 is executing the work process of "processing 1" for a certain workpiece. In the work process of "processing 1", in order to release the processing 1 module 22 shown on the horizontal axis, the robot 21 described in a cell corresponding to "processing 1" on the vertical axis and "processing 1 module" on the horizontal axis is necessary. This relationship is shown as follows. "Processing 1 module 22→robot 21 (necessary for release)".

It is assumed that the manufacturing device 2 ends the work process of "load" for another workpiece and performs the work process of "taking out from the loader" (a second work process scheduled to be executed next) which is the next process. In this case, there is the following relationship. "Robot→Processing 1 module (necessary for release)".

When the two work processes are executed simultaneously, deadlock occurrence is predicted since resources required to be secured for resource release circulate between the work processes. This relationship is shown as follows. "Robot→Processing 1 module→Robot".

Generalizing the above relationship, a relationship in which the first resource (the processing 1 module 22) in which there is a work state (there is a workpiece (see Table 1)) corresponding to the first work process (processing 1) that is being executed is the same as the fourth resource (the processing 1 module 22) in which there is a work state (standby or there is a workpiece) corresponding to the fourth work process (conveying to the processing 1 module) that is a process next to the third work process (taking out from the loader) scheduled to be executed next, and the second resource (the robot 21) in which there is a work state (standby or workpiece gripped) corresponding to the second work process (taking out from the processing 1 module) that is a process next to the first work process is the same as the third resource (the robot 21) in which there is a work state (standby or workpiece gripped) corresponding to the third work process (taking out from the loader) scheduled to be executed next is satisfied.

As described above, the deadlock monitoring engine 15 predicts whether or not deadlock will occur in future by determining whether or not the above relationship is satisfied, before the execution engine 14 executes the work process "taking out from the loader" in steps S10 to S13 described above. When the deadlock monitoring engine 15 has predicted that deadlock will occur, the execution engine 14 completes the work processes of "processing 1" and suppresses an operation so that execution of "taking out from the loader" enters a standby state until resource circulation does not occur between the work processes.

[Example of Realization Using Software]

Control blocks of the process control device 9 (particularly, the execution engine 14 and the deadlock monitoring engine 15) may be realized by a logic circuit (hardware) formed in an integrated circuit (IC chip) or the like, or may be realized by software.

In the latter case, the process control device 9 includes a computer that executes instructions of a program which is software for realizing each function. The computer includes, for example, one or more processors, and includes a computer-readable recording medium storing the program. In the computer, the embodiment of the disclosure is realized by the processor reading the program from the recording medium and executing the program. As the processor, for example, a central processing unit (CPU) can be used. As the recording medium, a "non-temporary tangible medium" such as a tape, a disk, a card, a semiconductor memory, a programmable logic circuit, or the like, in addition to a read only memory (ROM), can be used. Further, the recording medium may further include a random access memory (RAM) into which the above program is developed. In addition, the above program may be supplied to the computer via an arbitrary transmission medium (such as a communication network or broadcast waves) capable of transferring the program. It should be noted that an aspect of the disclosure can also be realized in the form of a data signal embedded in a carrier wave, in which the program is embodied by electronic transfer.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A process control device that controls work processes of a manufacturing device that includes a plurality of process execution elements that can operate simultaneously and simultaneously manufactures a plurality of products using the plurality of process execution elements, the process control device comprising:
    a process execution control part that causes a process execution element to execute a work process in response to a predetermined trigger by referring to process constraint information in which a plurality of work processes and each work state of the plurality of process execution elements of the manufacturing device are associated with each other, wherein the process constraint information indicate a table showing an assembly procedure indicated by work process information and work state transitions indicated by work state information; and
    a deadlock determination part that determines whether or not a deadlock occurrence situation occurs when a work process that is being executed and a work process scheduled to be executed next are executed simultaneously by referring to the process constraint information,
    wherein when the deadlock determination part has determined that the deadlock occurrence situation occurs,
    the process execution control part delays an execution timing of the work process scheduled to be executed next,
    wherein the deadlock determination part extracts a first resource in which there is a work state corresponding to a first work process that is being executed, and a second resource in which there is a work state corresponding to a second work process that is a process next to the first work process by referring to the process constraint information, generates a table of resource correspondence information in which the first work process, the first resource, and the second resource are associated with each other, and determines whether or not the deadlock occurrence situation occurs by referring to the table of resource correspondence information.

2. The process control device according to claim 1, wherein the deadlock determination part extracts the first resource in which there is a work state corresponding to the first work process that is being executed, the second resource in which there is a work state corresponding to the second work process that is a process next to the first work process, a third resource in which there is a work state corresponding to a third work process scheduled to be executed next, and a fourth resource in which there is a work state corresponding to a fourth work process that is a process next to the third work process by referring to the process constraint information and the resource correspondence information, and
    determines that a deadlock occurrence situation occurs between the first work process and the third work process when the first resource is the same as the fourth resource and the second resource is the same as the third resource.

3. A manufacturing device, comprising:
    the process control device according to claim 1; and
    the plurality of process execution elements.

4. A manufacturing device, comprising:
    the process control device according to claim 2; and
    the plurality of process execution elements.

5. A non-statutory computer-readable recording medium storing a control program for causing a computer to function as the process control device according to claim 1, the control program causing the computer to function as the process execution control part and the deadlock determination part.

6. A process control method for controlling work processes of a manufacturing device that includes a plurality of process execution elements that can operate simultaneously and simultaneously manufactures a plurality of products using the plurality of process execution elements, the process control method comprising:
    a process execution control step of causing a process execution element to execute a work process in response to a predetermined trigger by referring to process constraint information in which a plurality of work processes and each work state of the plurality of process execution elements of the manufacturing device are associated with each other, wherein the process constraint information indicate a table showing an assembly procedure indicated by work process information and work state transitions indicated by work state information; and
    a deadlock determination step of determining whether or not a deadlock occurrence situation occurs when a work process that is being executed and a work process scheduled to be executed next are executed simultaneously by referring to the process constraint information, wherein when it has determined in the deadlock determination step that the deadlock occurrence situation occurs, the process execution control step includes delaying an execution timing of the work process scheduled to be executed next, wherein the deadlock determination step extracts a first resource in which there is a work state corresponding to a first work process that is being executed, and a second resource in which there is a work state corresponding to a second work process that is a process next to the first work process by referring to the process constraint information, generates a table of resource correspondence information in which the first work process, the first resource, and the second resource are associated with each other, and determines whether or not the deadlock occurrence situation occurs by referring to the table of resource correspondence information.

* * * * *